(12) United States Patent
Wisseman

(10) Patent No.: US 9,048,974 B2
(45) Date of Patent: *Jun. 2, 2015

(54) METHODS FOR EXPANDING CROSS-CONNECT CAPACITY IN A ROADM OPTICAL NETWORK

(71) Applicant: AT&T Intellectual Property I, L.P., Atlanta, GA (US)

(72) Inventor: Philip Wisseman, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/685,415

(22) Filed: Nov. 26, 2012

(65) Prior Publication Data

US 2013/0108267 A1 May 2, 2013

Related U.S. Application Data

(63) Continuation of application No. 12/569,191, filed on Sep. 29, 2009, now Pat. No. 8,346,089.

(51) Int. Cl.
*H04J 14/02* (2006.01)

(52) U.S. Cl.
CPC ......... *H04J 14/0209* (2013.01); *H04J 14/0204* (2013.01); *H04J 14/0205* (2013.01); *H04J 14/0212* (2013.01); *H04J 14/0213* (2013.01); *H04J 14/0217* (2013.01); *H04J 14/0219* (2013.01)

(58) Field of Classification Search
CPC .............. H04J 14/0204; H04J 14/0205; H04J 14/0209; H04J 14/0212; H04J 14/0213; H04J 14/0217; H04J 14/0219
USPC .................................................. 398/49–50, 83
See application file for complete search history.

(56) References Cited

U.S. PATENT DOCUMENTS

| | | | |
|---|---|---|---|
| 7,620,321 B2 * | 11/2009 | Miura et al. ..................... 398/45 |
| 7,792,428 B2 | 9/2010 | Akiyama et al. |
| 7,899,334 B2 | 3/2011 | Zhong et al. |
| 2002/0159114 A1 * | 10/2002 | Sahasrabuddhe et al. .... 359/117 |
| 2002/0197000 A1 * | 12/2002 | Marom ........................... 385/17 |
| 2008/0002974 A1 * | 1/2008 | Zhong et al. ..................... 398/48 |
| 2008/0292310 A1 * | 11/2008 | Li ..................................... 398/5 |
| 2009/0232497 A1 | 9/2009 | Archambault et al. |
| 2009/0290873 A1 | 11/2009 | Takita et al. |
| 2010/0027995 A1 * | 2/2010 | Farley ............................. 398/49 |

* cited by examiner

*Primary Examiner* — Shi K Li
(74) *Attorney, Agent, or Firm* — Wolff & Samson PC

(57) ABSTRACT

A reconfigurable optical add-drop multiplexer (ROADM) transport network comprising a plurality of optical fan-out devices and a first plurality and a second plurality of demultiplexers for locally dropping selected wavelengths; and first plurality and a second plurality of multiplexers for locally adding selected wavelengths, the first and second plurality disposed in a cascaded relationship to enable selective coupling between network degrees.

9 Claims, 5 Drawing Sheets

METHODS FOR EXPANDING CROSS-CONNECT CAPACITY IN A ROADM OPTICAL NETWORK

This application is a continuation of prior application Ser. No. 12/569,191, filed Sep. 29, 2009, which is hereby incorporated by reference.

FIELD OF THE DISCLOSURE

The present disclosure relates generally to communication networks, and more particularly, to a reconfigurable optical add/drop multiplexer (ROADM) node for selectively coupling network degrees via an optical cross-connect.

BACKGROUND

In less than a decade, the state of the art in fiber-optic transport systems has progressed from simple point-to-point chains of optically amplified fiber spans to massive networks with hundreds of optically amplified spans connecting transparent add/drop nodes spread over transcontinental distances. Cost reduction has been the primary driver for this transformation, and the primary enabler has been the emergence of the ROADM as a network element (NE).

Exploiting the inherent wavelength granularity of wavelength-division multiplexing (WDM), an optical add/drop multiplexer (OADM) allows some WDM channels (also referred to as wavelengths) to be dropped at a node, while the others traverse the same node without electronic regeneration. Previously, it was necessary to terminate line systems at each node served, and then regenerate the wavelength signals destined for other nodes. The ability to optically add/drop a fraction of a system's wavelengths at a node was first achieved using fixed OADMs. These were constructed from optical filters, and by enabling wavelengths to optically bypass nodes and eliminate unnecessary regeneration, they provided significant cost savings. However, because traffic growth is inherently unpredictable, it is advantageous for the add/drop capability to be reconfigurable.

ROADMs provide many advantages beyond the savings achieved by optically bypassing nodes. In the future, multi-degree ROADMs with adequate reconfiguration speeds may enable shared-mesh restoration at the optical layer. Shared mesh restoration significantly reduces the number of wavelength channels that must be installed as redundant protection circuits. ROADMs also provide operational advantages. Because ROADMs can be reconfigured remotely, they enable new wavelength channels to be installed by simply placing transponders at the end points, without needing to visit multiple intermediate sites. In addition to these cost-saving benefits, ROADMs will enable new services. For example, if transponders are preinstalled, then new circuits can be provided on-demand. The rapid network reconfiguration provided by ROADMs could also become an enabler of dynamic network services, such as switched video for IPTV. For all of these reasons, ROADMs will continue to have a significant effect on the design of optical networks.

Generally, a ROADM is defined as a NE that permits the active selection of add and drop wavelengths within a WDM signal, while allowing the remaining wavelengths to be passed through transparently to other network nodes. Thus, the simplest ROADM will have two line ports (East and West) that connect to other nodes, and one local port (add/drop) that connects to local transceivers. In today's networks, optical links are typically bidirectional, so each line port represents a pair of fibers. When using conventional local transceivers that can process only a single wavelength at a time, the number of fibers in the add/drop port sets the maximum number of wavelengths that can be added or dropped at a given node.

A ROADM with only two line ports (East and West) is referred to as a two-degree ROADM. Practical networks also have a need for multi-degree ROADMs that can serve more than two line ports. In addition to providing local add/drop from each of its line ports, the multi-degree ROADM must be able to interconnect any individual wavelength from one line port to another, in a reconfigurable way. The degree of a multi-degree ROADM is equal to the number of line-side fiber pairs that it supports (it does not include the number of fiber pairs used in the add/drop portion of the ROADM).

A full ROADM provides add/drop (de)multiplexing of any arbitrary combination of wavelengths supported by the system with no maximum, minimum, or grouping constraints. A partial ROADM only has access to a subset of the wavelengths, or the choice of the first wavelength introduces constraints on other wavelengths to be dropped. The drop fraction of a ROADM is the maximum number of wavelengths that can be simultaneously dropped, divided by the total number of wavelengths in the WDM signal. If a given add or drop fiber is capable of handling any wavelength, it is said to be colorless. If a given add or drop fiber can be set to address any of the line ports (e.g., east or west for a 2-degree ROADM), it is said to be "steerable." A NE can be configured such that no single failure will cause a loss of add/drop service to any two of its line ports.

Carriers wish to deploy systems in the most cost-effective manner possible. Today, it is far more cost-effective to initially deploy the minimal amount of equipment that can smoothly evolve to meet future needs, rather than to deploy a fully loaded system configuration from the very beginning. Currently and for the foreseeable future, transponders make up the dominant cost of a fully loaded optical communication system. If a full set of transponders were included in the initial deployment, then a substantial cost would be incurred before the network had sufficient traffic to support the expense. Therefore, systems are routinely designed to permit incremental deployment of transponders on an as-needed basis. Similar considerations also apply to multiplexers, although the economic drivers are not as strong. In general, modular growth will be supported whenever the additional cost and complication of upgrading to higher capacity in the future is small compared to the financial impact of a full equipment deployment at startup. By designing this pay-as-you-grow approach into ROADMs, the network itself can grow in a cost-effective manner. Traditional networks grow by adding and interconnecting stand-alone line systems, incurring substantial cost and complexity. By using ROADMs that allow for modular deployment of additional ports, network growth can benefit from both the equipment and operational efficiencies of integrating line systems as they are needed into a seamless network. Because networks are deployed over the course of years, carriers prefer to be able to grow the nodes of the network from terminals or amplifiers into multi-degree ROADMs. This not only allows the expense to be spread out over years, it also enables the network designers to respond to unforeseen traffic growth patterns.

FIG. 1 is a schematic of a conventional multi-degree ROADM system 100 (four network degrees are shown). Each network degree is coupled to a pair of optical amplifiers 102, with an input connected to a 1×N optical fan-in device, i.e., a power splitter (PS) or wavelength selective switch (WSS) 104, and an output connected to a N×1 optical fan-out device, i.e., WSS 106. Multiplexed optical signals on input $108_1$ from network degree 1 are selectively directed via PS/WSS 104 to WSS 106 and associated outputs $110_2$, $110_3$ and/or $110_4$ for network degrees 2, 3 and/or 4, respectively. In the same manner, multiplexed optical signals on inputs $108_2$, $108_3$ and $108_4$ (network degrees 2, 3 and 4) may be similarly routed to the other network degrees of the system. A plurality of multiplexer/demultiplexer assemblies $112_1$, $112_2$, $112_3$, and $112_4$ are connected to the WSSs 106 and PS/WSSs 104 for locally adding/dropping wavelengths to/from each network degree 1, 2, 3 and 4 by WSSs 106 and PS/WSSs 104. In this implementation, the add/drop wavelengths cannot be redirected between the network degrees because the multiplexers and demultiplexers for the add/drop wavelengths are connected to only one of the degrees. Therefore, dynamic wavelength applications such as bandwidth on-demand, mesh restoration, or wavelength redistribution cannot be supported. In addition, current multiplexers and demultiplexers typically have fixed wavelength ports.

ROADM configurations have been proposed for supporting shared add/drop that utilize a WSS in at least one direction to select the desired network degree for each wavelength. These are combined with a colorless add/drop expedient that uses WSSs for the multiplexer and demultiplexer in a back-to-back WSS arrangement. An M×1 WSS selects the network degree, where M is the number of shared degrees, and a 1×N WSS utilized as a multiplexer and demultiplexer, where N is the number of add/drop ports. This cascaded configuration suffers from inherent drawbacks such as excessive insertion loss.

Another significant drawback of current shared add/drop ROADM designs is that only one instance of each wavelength can be supported among the degrees sharing the multiplexer and demultiplexer. This is true for both fixed-wavelength port designs and colorless port designs due to the limitations of current WSSs required to select the degree for each wavelength. This may require an additional shared multiplexer/demultiplexer due to wavelength availability restrictions, even when add/drop ports are still open.

Proposed applications for the multi-degree and cross-connect capabilities include adding overlay network capacity, supporting multiplexed-wavelength services, and supporting shared wavelength add/drop capacity. These applications will require some locations to exceed the number of degrees that can be supported by current ROADM systems. Previously proposed solutions involve using either larger WSSs for the ROADM nodes or using separate optical cross-connect equipment. However, these solutions are not practical for the in-service expansion of existing ROADM nodes. In addition, since it is difficult to predict where or when this additional cross-connect capacity will be needed; the use of a ROADM node with a large WSS will result in wasted capacity at most locations.

It would therefore be desirable to provide a system and methodology for facilitating in-service growth of ROADM nodes that only deploy additional WSS equipment as needed.

Summary

In accordance with an aspect of the present disclosure, a system is disclosed for dynamically adding/dropping wavelengths in a reconfigurable optical add-drop multiplexer (ROADM) transport network. The system generally comprises a plurality of optical fan-out devices, each arranged to receive an input signal from a network degree and coupled to at least one of a plurality of optical fan-in devices, each optical fan-in device arranged to output a signal to a network degree, the optical fan-out devices and optical fan-in devices being connected so as to enable signals input from each of the plurality of network degrees to be switched to another network degree of the plurality of network degrees, wherein a first plurality and a second plurality of demultiplexers are deployed for locally dropping selected wavelengths; and a first plurality and a second plurality of multiplexers are deployed for locally adding selected wavelengths, the first and second plurality forming a cross-connect and disposed in a cascaded relationship.

In accordance with another aspect of the disclosure, a method is disclosed for dynamically adding/dropping wavelengths in a ROADM transport network as characterized above. The method comprises the steps of: directing signals from the network degrees to a first and second plurality of demultiplexers for locally dropping selected wavelengths; and directing signals to a first and second plurality of multiplexers for locally adding selected wavelengths, wherein the first and second plurality of demultiplexers and multiplexers are disposed in a cascaded relationship.

These aspects of the disclosure and further advantages thereof will become apparent to those skilled in the art as the present disclosure is described with particular reference to the accompanying drawings.

DETAILED DESCRIPTION

Embodiments of the disclosure will be described with reference to the accompanying drawing figures wherein like numbers represent like elements throughout to the extent possible. Before embodiments of the disclosure are explained in detail, it is to be understood that the disclosure is not limited in its application to the details of the examples set forth in the following description or illustrated in the figures. The disclosure is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
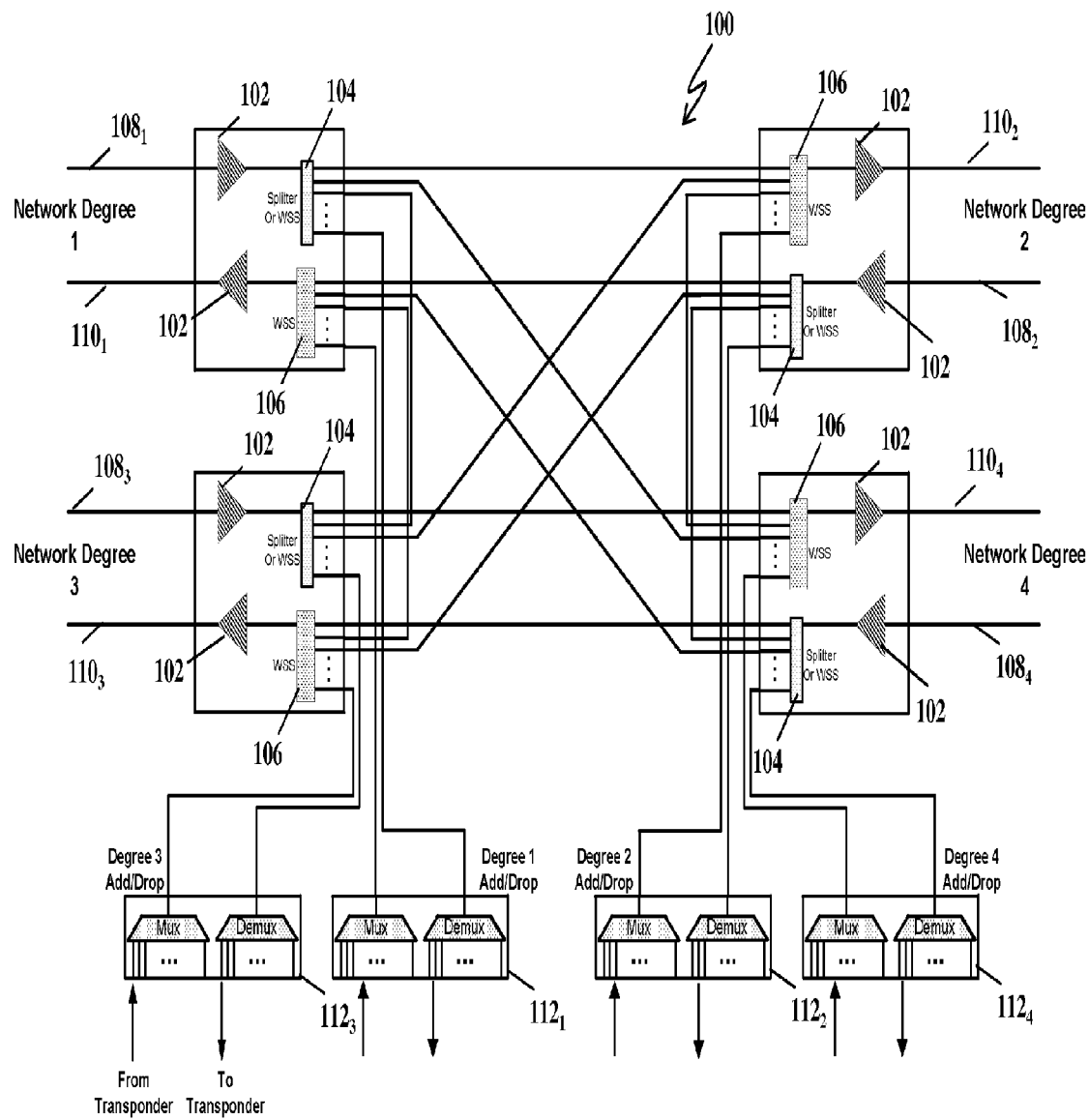
FIG. 1 is a schematic of a conventional multi-degree ROADM system.
Figure 2:
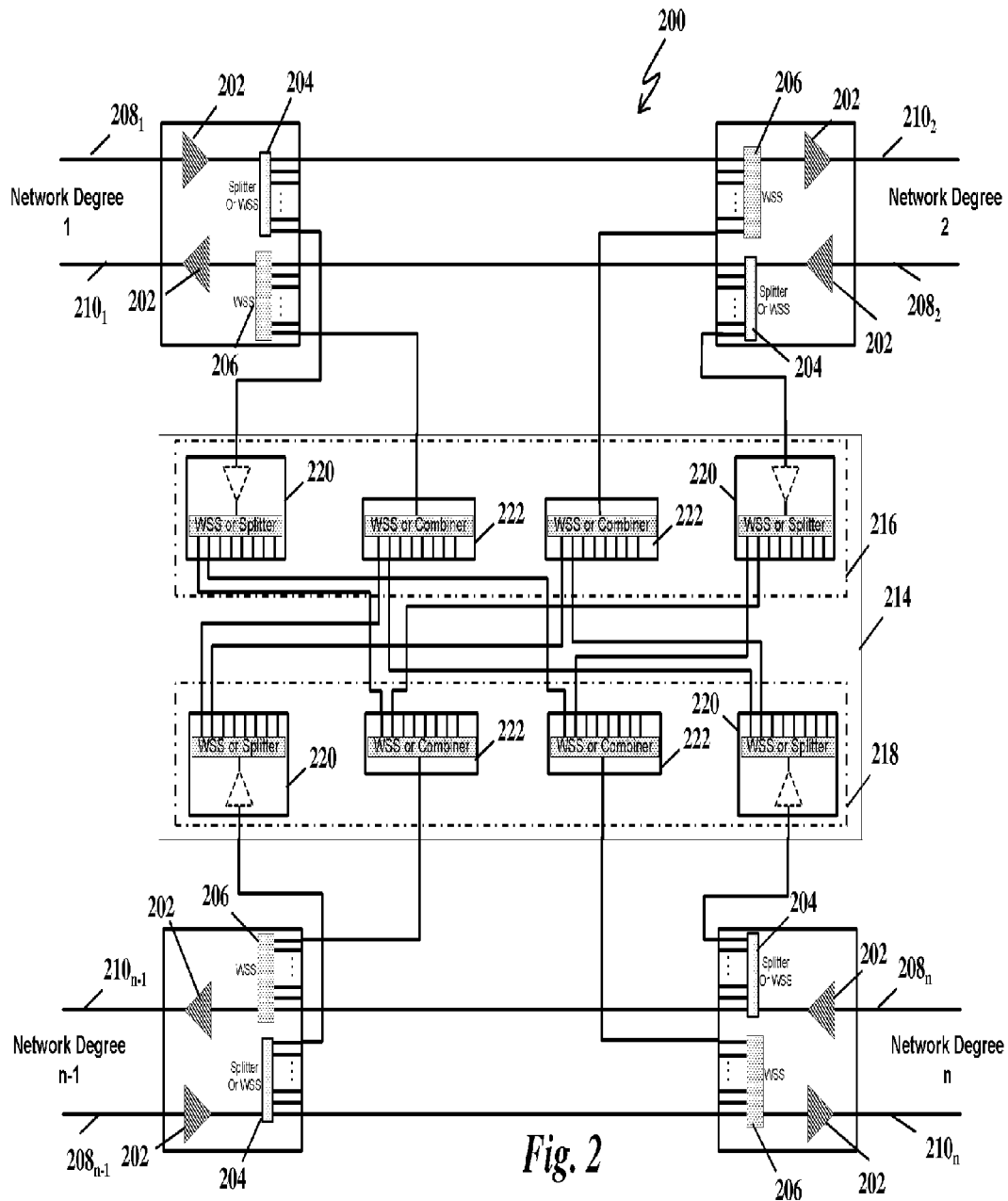
FIG. 2 is a schematic of an exemplary multi-degree ROADM system in accordance with an aspect of the present disclosure.

FIG. 2 is a schematic of an exemplary multi-degree ROADM system 200 in accordance with an aspect of the present disclosure. As shown, four network degrees 1, 2, n−1 and n, each degree having an input $208_1$, $208_2$, $208_{n-1}$, and $208_n$, respectively, are coupled to an amplifier 202 and a 1×N PS or WSS 204. Similarly, each degree has an output $210_1$, $210_2$, $210_{n-1}$ and $210_n$, respectively, coupled to an amplifier 202 and an N×1 WSS 206. 214 shows the cross-connect which is comprised of a first plurality of WSSs 216 and a second plurality of WSSs 218 arranged in a cascading relationship. The first plurality of WSSs 216 and the second plurality of WSSs 218 are further comprised of WSS/PSs 220 for routing and dropping of wavelengths and WSS/Combiners 222 for routing and adding of wavelengths. The preferred method is that this expansion is added to pre-designated expansion ports on the initial WSS in the add direction and splitter/WSS in the drop direction. With this configuration, every network degree is now coupled to every other network degree either directly or through the cross-connect 214.

Figure 3:
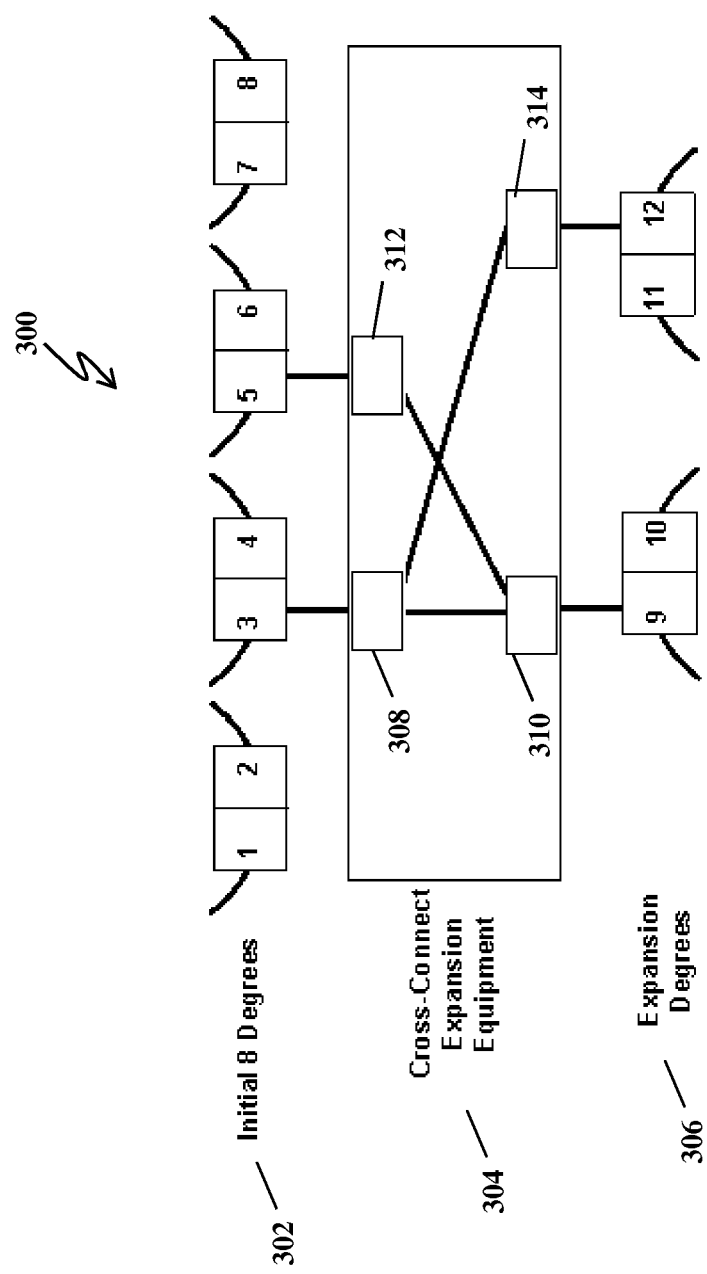
FIG. 3 is a high-level schematic of an exemplary expedient for incrementally expanding an initial 8 degree network to a 12 degree network.

FIG. 3 is a high-level schematic of an exemplary expedient 300 for incrementally expanding an initial 8 degree network to a 12 degree network such that capacity is added only when and where needed. Network degrees 1 through 8 (collectively shown as 302) exemplify the initial network deployment. Cross-connect expansion equipment 304 is added as needed, enabling expansion degrees 306. In a first cross-connect expansion, components 308 and 310 are added, coupling network degrees 3 and 4 to expansion degrees 9 and 10. In a second cross-connect expansion, component 312 is added, enabling a cross-connect from existing expansion degrees 9 and 10 to a second core degree, network degrees 5 and 6. In a third cross-connect expansion, component 314 is added, enabling a cross-connect from an already expanded core degree, network degrees 3 and 4, to a new expansion degree, network degrees 11 and 12.

Another aspect of the present disclosure facilitates expanding the capacity of a ROADM node by permitting partial connectivity between the individual ROADM degrees. This improves on currently deployed multi-degree ROADM systems which support full connectivity between all the degrees in the network.

Figure 4:
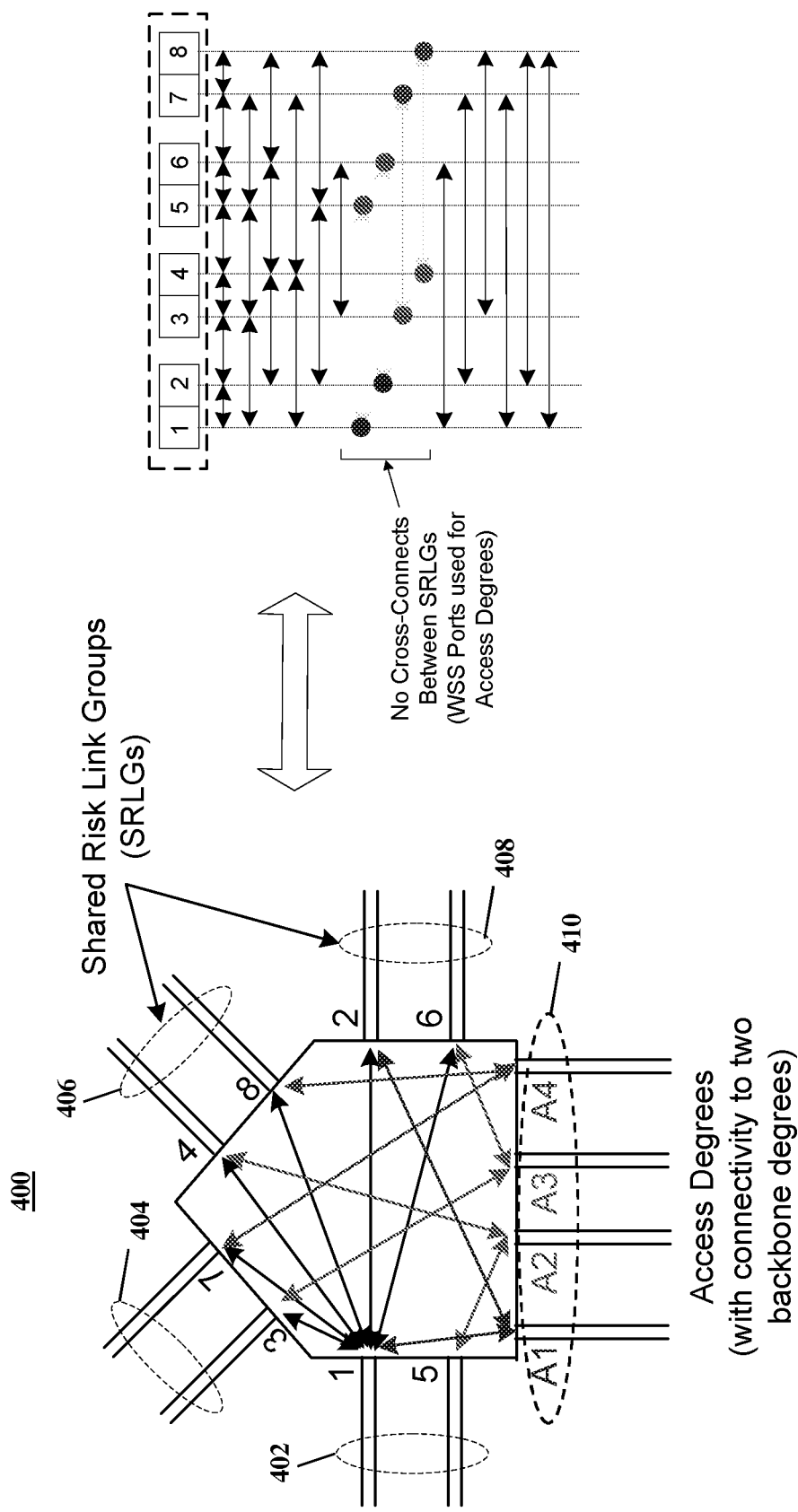
FIG. 4 is a schematic depicting the connections between ports that enable partial connectivity between network degrees.

FIG. 4 is a schematic depicting the connections between ports of an exemplary multi-degree ROADM node that enables partial connectivity between network degrees. Thus, existing cross-connect capacity can be utilized more efficiently and the number of supported degrees can be increased. As shown in FIG. 4, a ROADM node 400 initially designed to support 8-degrees, where four degrees support connections to other network locations and four degrees support overlay capacity, can now be modified to support a total of 12 degrees. Shared Risk Link Groups (SRLGs) between degrees 1 and 5, 3 and 7, 4 and 8, and 2 and 6 are designated by 402, 404, 406 and 408 respectively. Since each of the pairs of degrees shown comprise an SRLG, and since no cross-connect is required between degrees in the same SRLG, the partial connectivity and elimination of the fixed port association allows these cross-connect ports to be used to support the additional access degrees. Therefore, the node can support four access degrees: A1, A2, A3 and A4, collectively identified as 410, for multiplexed wavelength services. As a result of each access degree 410 having connectivity to two degrees, the node 400 can now support a total of 12 degrees.

Figure 5:
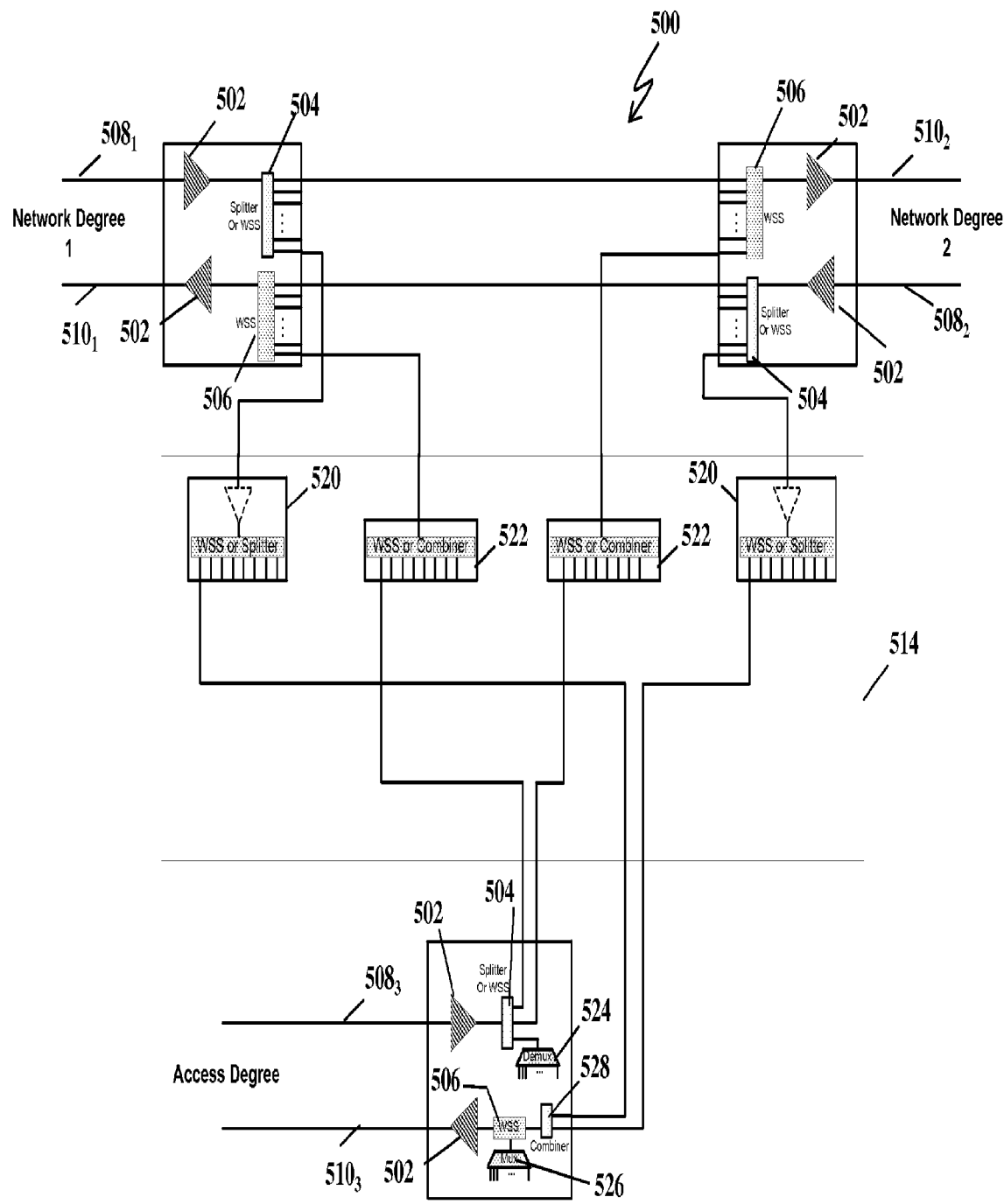
FIG. 5 is a schematic of a ROADM node and an exemplary access degree configuration.

FIG. 5 is a schematic of a ROADM node 500 and an exemplary access degree configuration. This configuration supports multiplexed-wavelength service applications, particularly in a ROADM network that consists of multiple interconnected rings. As shown, two network degrees 1 and 2, each having an input $508_1$ and $508_2$, coupled to an amplifier 502 and a 1×N PS or WSS 504, respectively. Similarly, each degree has an output $510_1$ and $510_2$, coupled to an amplifier 502 and an N×1 WSS 506, respectively. A cross-connect 514 comprises a plurality of WSS/PS(s) 520 for routing and dropping wavelengths, and WSS/Combiner(s) 522 for routing and adding wavelengths to/from each network degree. An access degree has an input $508_3$ coupled to an amplifier 502 and a 1×N PS or WSS 504 coupled to a demultiplexer 524. The access degree includes an output $510_3$, coupled to an amplifier 502, and an N×1 WSS 506 coupled to a multiplexer 526 and combiner 528. Note, this schematic omits the connection(s) to the end user/subscriber which may have a direct optical interface, or require the use of an optical/electrical (O-E) converter device to permit bidirectional communication with a network access device. As will be appreciated by those skilled in the art, other implementations are also possible, such as for example, reversing the placement of the WSS and passive combiner. In addition, an access degree may be directly connected to the initial cross-connect degree(s) of a ROADM node, or to expansion degrees as shown in FIG. 5.

The proposed methods of WSS port expansion, incremental growth, and partial connectivity can be combined to allow flexible growth of the cross-connect capacity of a ROADM node. By applying the concepts of incremental growth and partial connectivity, WSS port expansion only needs to be added to degrees that have exhausted the available number of WSS ports associated with that degree. Also, configurations similar to those in FIGS. 2 and 5 can both be used as needed for adding new degrees to a node. In this way, an incrementally scalable cross-connect can be realized that can grow as needed to support a very large number of degrees.

Implementing partial connectivity requires eliminating the fixed association between WSS ports and ROADM node degrees that are typically found in current ROADM nodes through either software limitations or fixed fiber interconnection. Eliminating these fixed associations allows for more efficient and flexible use of WSS port capacity, but can result in more complicated fiber interconnection issues. Options for addressing the fiber interconnection are to 1) use a fiber distribution frame (FDF) or similar passive fiber interconnection management panel, 2) use a fiber cross-connect switch, or 3) use a combination of fixed (pre-determined) fiber interconnection and small-scale fiber cross-connect switches.

The proposed methods provide a solution for expanding the cross-connect capacity of current multi-degree ROADM nodes with the additional capacity deployed when and where needed. This expansion can be implemented in-service to the current ROADM network to allow the addition of overlay capacity and to support new wavelength services.

The foregoing detailed description is to be understood as being in every respect illustrative and exemplary, but not restrictive, and the scope of the disclosure disclosed herein is not to be determined from the description of the disclosure, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure.

I claim:

1. A system for dynamically adding and dropping wavelengths in a reconfigurable optical add-drop multiplexer transport network comprising:

a plurality of cross-connect modules arranged in a cascaded relationship, each of the plurality of cross-connect modules comprising:
a plurality of multiplexers for receiving an input signal from a first network degree and to output a signal to a second network degree, and for routing and locally adding selected wavelengths, wherein one of the plurality of multiplexers comprises a first wavelength selective switch; and
a plurality of demultiplexers for receiving an input signal from a third network degree and to output a signal to a fourth network degree, and for routing and locally dropping selected wavelengths, wherein one of the plurality of demultiplexers comprises a second wavelength selective switch, wherein every network degree in the reconfigurable optical add-drop multiplexer transport network is coupled to every other network degree.

2. The system of claim 1, further comprising:
an access node comprising:
- a plurality of amplifiers;
- an input communicatively coupled to one of the plurality of amplifiers;
- an output communicatively coupled to one other of the plurality of amplifiers;
- a multiplexer;
- a demultiplexer;
- a power splitter communicatively coupled to the demultiplexer; and
- an optical combiner.

3. The system of claim 1, wherein each of the plurality of multiplexers and each of the plurality of demultiplexers comprise a plurality of expansion ports.

4. The system of claim 1, wherein each of the plurality of demultiplexers and each of the plurality of multiplexers comprise a power splitter.

5. The system of claim 1, wherein each of the plurality of demultiplexers and each of the plurality of multiplexers comprise an optical combiner.

6. A method for dynamically adding and dropping wavelengths in a reconfigurable optical add-drop multiplexer transport network comprising:

receiving signals from a first network degree at a plurality of cross-connect modules for routing and dropping selected wavelengths between selected network degrees; and receiving signals from a second network degree at the plurality of cross-connect modules for adding selected wavelengths between selected network degrees;

wherein the plurality of cross-connect modules is arranged in a cascaded relationship for switching signals input from each of a plurality of network degrees to another network degree of the plurality of network degrees, wherein each of the plurality of network degrees is coupled to every other network degree of the plurality of network degrees, and wherein each of the plurality of cross-connect modules comprise a plurality of multiplexers and a plurality of demultiplexers comprising a plurality of wavelength selective switches.

7. The method of claim 6, wherein each of the plurality of multiplexers and each of the plurality of demultiplexers comprise a plurality of expansion ports.

8. The method of claim 6, wherein each of the plurality of demultiplexers and each of the plurality of multiplexers comprise a power splitter.

9. The method of claim 6, wherein each of the plurality of demultiplexers and each of the plurality of multiplexers comprise an optical combiner.

* * * * *